United States Patent [19]
Medney

[11] 3,817,649
[45] June 18, 1974

[54] PIPE SCARFING TOOL
[76] Inventor: Jonas Medney, 3504 Woodward St., Oceanside, N.Y. 11770
[22] Filed: Dec. 13, 1972
[21] Appl. No.: 314,700

[52] U.S. Cl.................... 408/211, 82/4 C, 144/205
[51] Int. Cl............................................. B23b 5/16
[58] Field of Search................ 408/211; 72/4 C, 20; 144/205

[56] References Cited
UNITED STATES PATENTS

| | | | |
|---|---|---|---|
| 353,761 | 12/1886 | Rush | 144/205 |
| 2,868,085 | 1/1959 | Klein | 82/4 C |
| 3,118,476 | 1/1964 | Fiore | 144/205 |
| 3,167,982 | 2/1965 | Sherwood | 82/4 C |

*Primary Examiner*—Francis S. Husar
*Attorney, Agent, or Firm*—Leonard H. King

[57] ABSTRACT

In a pipe scarfing tool, a rotatable housing is provided in which a plurality of cutting blades are included. The cutting blades are generally radially oriented and extend longitudinally at an angle with respect to the rotational axis of the housing. The cutting blades are readily removable and replaceable and are provided with four longitudinal edges each of which is a cutting edge.

The aforementioned Abstract is neither intended to define the invention of the application which, of course, is measured by the claims, nor is it intended to be limiting as to the scope of the invention in any way.

10 Claims, 5 Drawing Figures

PATENTED JUN 18 1974 3,817,649
FIG. 1
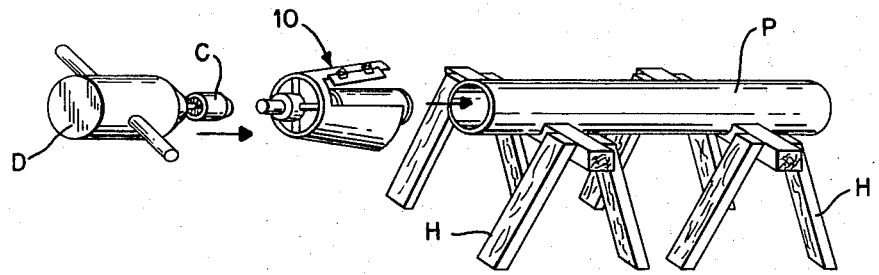
FIG. 2
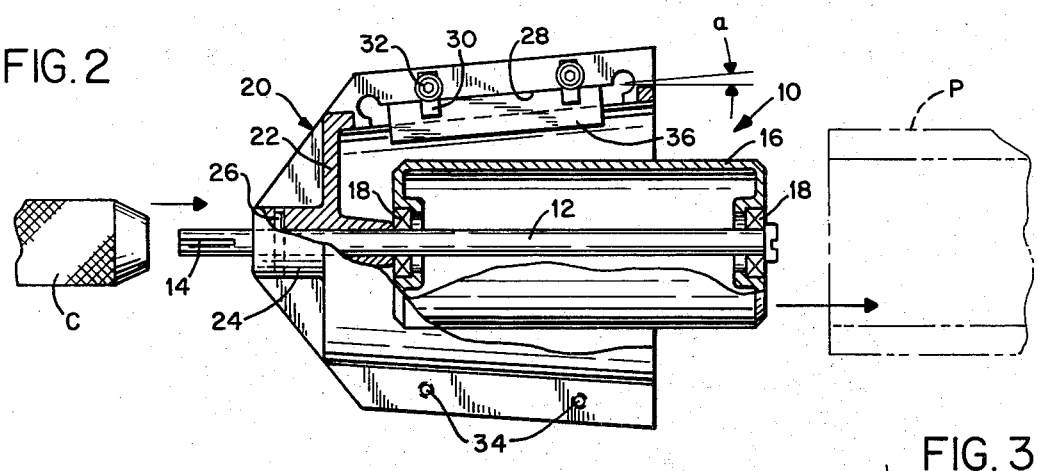
FIG. 3
FIG. 5
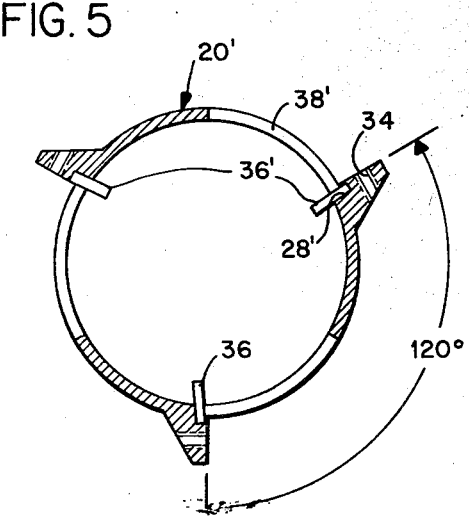
FIG. 4

PIPE SCARFING TOOL

This invention relates to an improved scarfing tool and more particularly to a portable tool that will produce a taper on the end of a length of pipe.

One method of securing an end fitting to a length of pipe is to taper the end of the pipe and cement the similarly tapered fitting thereto. Since the holding power of the joint so formed is due, at least in part, to the resulting inclined plane effect, it is imperative that the taper on the end of the pipe be accurately formed. It is also essential that the machining operation be carried out by relatively inexpensive tools that are not complex to operate. The machining operation for forming the taper presents something of a problem particularly when it must be done in the field where shop facilities are not readily available. Specifically, the time spent forming the taper is critical because of the cost involved and because of the frequently adverse condition under which the taper must be formed in the field.

One example of the prior art is disclosed in U.S. Pat. No. 3,335,526 granted on Aug. 15, 1967, to Charles P. Weiss. The issued patent teaches an attachment that may be applied to a power driven tool such as a drill. A variety of cutting means for example an abrasive cloth or a diamond cutter in the shape of a cone having the desired included angle is secured within a hollow, open ended housing, the interior surface of which has the desired taper. The housing surrounds, at least partially, a pilot piece having an outside diameter of such size as to assure a reasonably close fit with the diameter of the pipe to be machined.

In the prior art device the pilot piece is inserted into the pipe end until the conical cutting surface makes contact with the outside surface of the pipe. The drill is then energized to begin the scarfing process. An extremely course abrasive cutter may be used when a rough finish is desired. It will be appreciated that the prior art will require frequent replacement of costly abrading cloth because of loading of the cloth with removed material. Replacement of the cloth is time consuming because it must be placed carefully inside of the cone to ensure a smooth fit. Further the abrasive action is relatively slow thus requiring considerable machining time in the field.

By way of contrast to the prior art the present invention eliminates the conical cutting member and substitutes therefor a plurality of angularly spaced apart blades, each of which has a plurality of longitudinally extending cutting edges. The hollow housing of the present invention is provided with a plurality of surfaces for mounting the blades with the blade mounting surfaces being at the desired angle with respect to the rotational axis of the housing. Two or more blades, preferably carbide, may be used with the present invention and the cutting edge of each blade is off center with respect to the diametrical dimension of the housing. Each blade is set at a negative rake angle.

By having two or more blades the present invention eliminates the tendency of certain other prior art hand tools that are now used to bend away from the blade and give false angles. The bending away of the blade in some prior art structure becomes more and more pronounced as the tool becomes dull. By using either two opposing blades or a plurality of blades that are equally spaced apart in an angular direction the tendency of blade bending is eliminated because of the balanced system. Because each blade has four cutting edges the blade life is materially lengthened so that with the present invention up to 1,000 scarfs may be made before the blades have to be changed.

Accordingly, it is a primary object of the present invention to provide an improved, portable scarfing tool.

Another object of the present invention is to provide a scarfing tool that is utilized with a power driven hand tool.

An additional object of the present invention is to provide an improved power driven type scarfing tool, as described above, wherein a plurality of readily removable and replaceable blades are used instead of a conical abrasive member.

A feature of the present invention is that each of the blades includes four generally longitudinally extending cutting edges.

These and other features, objects and advantages of the invention will, in part, be pointed out with particularity and will, in part, become obvious from the following more detailed description of the invention, taken in conjunction with the accompanying drawings which forms an integral part thereof.

In the various figures of the drawing like reference characters designate like parts. In the drawing:

FIG. 1 is an exploded, perspective view schematically illustrating the present invention;

FIG. 2 is an exploded side elevational view, partially in section, illustrating one embodiment of the present invention;

FIG. 3 is a fragmentary, schematic side elevational view fragmentarily showing the mode of operation of the present invention;

FIG. 4 is an end elevational view, partially broken away, illustrating one embodiment of the present invention; and FIG. 5 is a transverse cross sectional view illustrating an alternative embodiment of the present invention.

Description of the Invention

Turning now to FIG. 1 of the drawing there is shown a pipe P mounted on axially spaced apart saw horses H, a power tool such as a drill D having a chuck C and a pipe scarfing tool 10 comprising the present invention. For purposes of illustration the pipe P may be a resin bonded helically wound glass fiber pipe.

FIG. 2 shows, on an enlarged scale, the improved pipe scarfing tool 10 comprising the present invention. The tool 10 comprises an elongated shaft 12 having keying means such as flats 14 on one end thereof that are adapted to be received in the chuck C of the drill D. The other end of the shaft 12 is provided with a pilot piece 16 that, preferably, is hollow and which includes bearings 18 in which the shaft 12 is rotatably journaled. The outside diameter of the pilot piece 16 is sized so as to be snugly received within the inside diameter of the pipe P and to be non-rotatable with respect thereto.

The pipe scarfing tool 10 further includes a housing, generally designated by the reference character 20, which is open at one end for receiving the pipe P. The housing 20 at the other end includes a transverse web 22 and a boss 24 extending therefrom. A pin 26 extends through the boss 24 and the shaft 12 so as to couple the housing 20 to the shaft 12 for rotation together therewith.

The housing 20 further includes a plurality of radially extending seats 28 that extend longitudinally and at an angle $a$ with respect to the rotational axis of the shaft 12. Angle $a$ is, in one embodiment of this invention, between 1°30' and 2°25'. Clamp means 30, in combination with bolts 32, and tapped holes 34 are used for removably securing a blade 36 to each of the seats 28. When clamped in place, the cutting edge of each blade 36 is also positioned at angle a with respect to the longitudinal axis of rotation of the shaft 12.

As shown in FIG. 4, one embodiment of the present invention provides for two opposed blades 36, each having four cutting edges. The cutting edges of each blade is mounted such that it is approximately 2½° off the center line of the diametrical dimension that runs through the longitudinal axis of the shaft 12. Each of the blades is preferably mounted at a negative rake angle. It should also be noted that each longitudinal edge of the blade is a cutting edge so that, when dull, the blade may be rotated 90° to present a new cutting edge until all four of the edges are dull, at which time the blade may readialy be changed. To facilitate changing of the blades the housing 20 is provided with a plurality of openings 38 through the wall thereof. The openings 38 are also to permit the machined material to be removed. The openings 38 are equal in number to the number of blades used. Thus, in the embodiment shown in FIG. 5 there are three angularly spaced apart openings 38' each of which is adjacent a blade 36'. Like reference characters with prime designations are used in FIG. 5 to indicate like components with respect to FIG. 4.

As shown in FIG. 3 the pilot piece 16 is inserted within the interior of the pipe P and, because of the close dimensional relationship therebetween, relative rotational movement between the pipe P and the pilot piece 16 is prevented. The drill D is then energized so that the cutting edges of the blades 36 form a taper T on the outside end portion of the pipe P. The angle of the taper T formed on the end of the pipe P is at the same angle at which the blades 36 are set. During the cutting process the pipe and the resin that bonds the fibers heat up making it easier to shear them than can be done in the cold condition as is the case with a single tool turned by hand.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A pipe scarfing tool adapted to be driven by a power tool, said pipe scarfing tool comprising:
    a. a shaft adapted to be secured to the power tool for rotation thereby;
    b. a pilot piece mounted on and rotatable with respect to said shaft, the outer surface of said pilot piece being concentric with the rotational axis of said shaft and adapted to frictionally engage the inside diameter of the pipe to be scarfed;
    c. a hollow, cup shaped housing at least partially surrounding said pilot piece and rigidly secured to said shaft for rotation together therewith, said housing including at least two longitudinally extending interior seats positioned at an angle with respect to rotational axis of said shaft; and
    d. a generally radially oriented, elongated cutting blade secured to each said seats whereby the cutting edge of each said blade extends at a predetermined negative rake angle with respect to the rotational axis of said shaft and is off the diametric center line of said housing.

2. The tool in accordance with claim 1 wherein there are two of said blades diametrically opposed to each other.

3. The tool in accordance with claim 2 wherein each said blades has a plurality of cutting edges.

4. The tool in accordance with claim 2 wherein each said blades has four cutting edges.

5. The tool in accordance with claim 1 wherein there are at least three of said blades equally spaced apart in an angular direction.

6. The tool in accordance with claim 5 wherein each said blades has a plurality of cutting edges.

7. The tool in accordance with claim 5 wherein each said blades has four cutting edges.

8. The tool in accordance with claim 1 further including clamp means for removably securing each said blades to its respective seat.

9. The tool in accordance with claim 8 wherein said housing includes openings through the wall thereof for providing access to said blades whereby said blades may be readily interchanged.

10. The tool in accordance with claim 1 wherein said shaft is rotatably journaled in said pilot piece.

* * * * *